(12) United States Patent
Abdulhayoglu

(10) Patent No.: US 11,209,950 B1
(45) Date of Patent: Dec. 28, 2021

(54) MULTIPLE CUSTOMIZABLE COMMUNICATION PROTOCOLS USED WITHIN A PLATFORM OR APPLICATION AND DEFINED BY USERS

(71) Applicant: Melih Abdulhayoglu, Montclair, NJ (US)

(72) Inventor: Melih Abdulhayoglu, Montclair, NJ (US)

( * ) Notice: Subject to any disclaimer, the term of this patent is extended or adjusted under 35 U.S.C. 154(b) by 0 days.

(21) Appl. No.: 16/141,957

(22) Filed: Sep. 25, 2018

Related U.S. Application Data

(60) Provisional application No. 62/563,634, filed on Sep. 26, 2017.

(51) Int. Cl.
   *H04L 12/58* (2006.01)
   *G06F 3/0481* (2013.01)
   *H04L 29/06* (2006.01)

(52) U.S. Cl.
   CPC ........... *G06F 3/0481* (2013.01); *H04L 69/18* (2013.01)

(58) Field of Classification Search
   CPC ................................ G06F 3/0481; H04L 69/18
   See application file for complete search history.

(56) References Cited

U.S. PATENT DOCUMENTS

| | | | |
|---|---|---|---|
| 2016/0014064 A1* | 1/2016 | Harper | H04L 51/046 709/206 |
| 2016/0072748 A1* | 3/2016 | Saar | H04L 51/12 455/414.1 |

* cited by examiner

*Primary Examiner* — Kim T Nguyen
(74) *Attorney, Agent, or Firm* — Joseph P. Aiena

(57) ABSTRACT

There is provided a customizable communication platform where a communication initiated from a first device and may be assigned an owner identifier and the communication saved in a data base. The owner identifier includes at least one communication participant device which add content objects to the communication which have been filtered against a set of rules of engagement. The communication owner identifier and the at least one communication participant device read the filtered content objects and perform actions enabled by the rules of engagement and then read the actions.

18 Claims, 10 Drawing Sheets

MULTIPLE CUSTOMIZABLE COMMUNICATION PROTOCOLS USED WITHIN A PLATFORM OR APPLICATION AND DEFINED BY USERS

CROSS REFERENCE TO RELATED APPLICATIONS

This application claims benefit of and priority to U.S. Provisional Application Ser. No. 62/563,364 filed on Sep. 26, 2017 and incorporated by reference herein in its entirety.

FIELD OF THE INVENTION

The present invention relates to multiple customizable communication protocols used within a single platform or application which is defined and applied by the users on the go during use.

BACKGROUND

A communication protocol can be defined as a system of rules engagement between two or more entities of a communications systems. All the currently existing communication systems (messengers, social websites and services, sales platforms, news feeds, etc.) that are available for public use are providing users with one predefined communication protocol that they have to follow. It should be considered how each of the capabilities can be reached with the old/existing methods in the world of multiple communication services/applications/websites, each of which provides the users with an only set of engagement rules ("communication protocol").

Define What Content You can Create:

As applications/services/websites today stick to a specific set of engagement rules, they tell the user what types and forms of content may be published using them (e.g. some only allow pictures with short comments, or texts limited by the number of symbols, or news on a specific topic).

The method that some applications/services/websites have used to enable user-driven choice of content was to widen the content-related rules as much as possible. For example, some services that initially were positioned as "short text only" now allow longer messages, pictures and video-file attachments. And user-wise, to publish the content that users want to publish they have to switch between numerous applications/services/websites and find the ones that their content is suitable for and as the audience of the above-mentioned broad-content applications/services/websites is less target oriented that often have to publish the content at several resources.

Define What Content Users Consume:

As applications/services/websites today stick to a specific set of engagement rules, they tell the user what types and forms of content they can select from. So, when users come to a specific application that is only for pictures, users expect to receive only pictures, and websites devoted to job promise users that all the content they will see is related to the topic. There are several methods that are used to let the user chose what content will be available to them.

Providing users with the necessary and relevant content is one of the major issues today, there is a number of provider-driven methods. For example, by using cookies, the content-providers check what kind of content will be more relevant for the user and then propose it to the user. Along with that, many content-providers enable users to priorities and filter specific content or block some types of content. Thus, while the user still has to switch between numerous applications/services/websites and find the ones that provide the content they need, once they have found the sources that correspond to their general need of content, they can sharpen and adjust them applying the set of filters and priorities if those are provided.

Define how Others can Use the Content:

As applications/services/websites today stick to a specific communication protocol, usually there is a limited set of actions, which define what actions can be done with regard to the content. When the user publishes some content, they often depend on the chosen application/service/website and cannot independently create the rules of further usage (e.g. if the content can be shared, and if yes, shall it have a watermark, etc.). The method used today is to watermark any content before a user ever publishes, to limit the list of users who see the content with those that are trusted to treat the content.

Define how a User can React to the Content:

The ability to react to the content is an important part of the engagement rules currently predefined for many applications/services/websites. The method that some applications/services/websites have used to enable user-driven choice of content-reaction was to widen the reaction-related rules, adding new ways of reaction along with simple comments. This way, the user can react to content in one of many ways predefined.

Define how Others can React to the Content:

When it comes to the user's ability to define how other can react to someone's content, many websites/applications/services provide hardly any way to manage that. Often all the users who can consume the content can react to it with all the tools available. That's why often an only method is to ask other users and rely on their readiness to follow requests. Today one can often see disclaimers like ("Please do not comment this post" or "I'll ban anyone who uses emoji for this post", etc.). Another option for the user is to significantly limit the list of users who can consume the content or to look for a website/service/application that doesn't provide for a specific type of reaction. Sometimes, the users are enable to filter the ways of reaction available to the content they've published (e.g. they can disable commenting for a specific post).

Define What Means of Interaction are Available:

As applications/services/websites today stick to a specific set of engagement rules, they tell the user what types and forms of interaction may be available using them (e.g. some provide for video-calls or phone-calls and others are limited with text-messaging). The method that some applications/services/websites have used to enable user-driven choice of the interaction-type was to widen the interaction-related rules as much as possible. For example, some services that initially were positioned as "text-message only" now allow video-calls. For a user, this means that they have look for an application/service/website that supports the ways of interaction wanted for communication with some other users on one hand, and on the other hand, they have to look for an application/service/website that limits the ways of interaction to avoid unwanted communication. Often this means that the user has to use several applications/services/websites to communicate with different counterparties.

Define the Conversation Type:

The three basic conversation types can be considered: one to one conversation, a group conversation and communications of a user with a website, application or service (user publishes or receives content). While today there are still some applications/services/websites that limit the user to an only conversation type, most of them have built-in widgets or incorporated application with which the user can switch between the conversation types.

A consideration of the methods' disadvantages in more detail is provided below:

Define What Content Users can Create:

Letting the user define what content they can create through maximum broadening of the content related rules results in the loss of the target-oriented audience that is ready to consume the specific type of content, and moreover, for the user, it will mean that the consumed content within the same conversation will not be limited either, so basically there is a high risk that too wide engagement rules on the content will, especially in large conversation groups, destroy the value of this content for its consumers.

On the other hand, making the user looks for numerous websites/services/applications where this specific material can be published may discourage the user of publishing anything at all, and moreover may not allow the content reach its target audience. At the same time, from the point of contain consumption, this may be rather inconvenient and tiring to have to check different sources to collect content from each single user you are interested in, and, on the other hand, if the user publishes similar content in different forms on different websites/services/application, one may get frustrated meeting the same content over and over again.

Define What Content You can Consume:

Even though cookie-based-systems are used to provide users with most relevant and needed content (both form and type-wise), they decide for the user, trying to guess, rather than asking.

Ability to define priorities and filter specific content or block some types of content sets the user in charge and lets them sharpen and adjust the content consumed, however, these rules are defined to the whole applications/service/website. Currently there is no way to stipulate different content-related rules for different conversation with different or the same users at a single platform. Most commonly, a user can only block a specific user or content type and then it gets blocked everywhere in the system.

Define how Others can Use the Content:

Disabling a specific function for the content is not always available, and when it is, its usage would mean that no user anywhere in the system can use the content in a specified way (e.g. share it). Limiting the list of users who see the content also may be unavailable in many websites/services/applications but even if it is, this will mean that those users won't be able to consume this content either. Basically, today there is no clear way to provide different level of access to the same content to different users at the same application, meaning that the user ether has to keep balancing between the audience size and the content security.

Define how You can React and how Other can React to the Content:

Today a website/service/application may provide users with little or many ways to react to the content, but whatever is the amount, they are always given "from the above", depend on the application and will be more or less the same for all the content over there. If there are too many, it's often confusing and overwhelming, if there are too little the users cannot provide and receive enough feedback and feel dissatisfied. And in each of these cases, the most that the conversation owner may do is disable some types of reaction (e.g. comments). In order to enable a new reaction one would have to contact the system support team and wait for years while the request is being processed (if accepted).

Define What Means of Interaction are Available:

Letting the user define the type of interaction to be used through maximum broadening of the interaction related rules result in inability to avoid unwanted interaction. On the other hand, too sharpened tools result in the need to use several applications/services/websites to communicate with different counterparties. Basically, today there is no obvious way to enable different interaction tools for different or same users at the same application within different conversations on the same platform. This means that that the user ether has to keep balancing between own comfort and ability to reach those they need in a way they need and when they need.

Define the Conversation Type:

While today many applications/services/websites have built-in widgets or incorporated application with which the user can switch between the conversation, the users still don't have enough power to manage the above-mentioned aspects for conversations of each type.

Particularly, now one cannot enable comprehensive but different rules of engagement for several conversations at the same platform.

SUMMARY OF THE INVENTION

The present invention enables users to customize and apply different communication protocols within one platform so that they can independently define what content can be created and consumed by them, how others can use this content, how they can react to this content and what means of interaction shall be available for each person-to-person, person to application or person-to-group conversation initiated by this user in our platform.

The present invention provides a customizable communication platform where a communication initiated from a first device and may be assigned an owner identifier and the communication saved in a data base. The owner identifier includes at least one communication participant device which add content objects to the communication which have been filtered against a set of rules of engagement. The communication owner identifier and the at least one communication participant device read the filtered content objects and perform actions enabled by the rules of engagement and then read the actions.

DETAILED DESCRIPTION

The present invention is a system and methods that enables users to customize and apply different communication protocols within one platform. From the user perspective, the messenger application available at our platform provides user to define so called "Rules of Engagement" (RoE) for each specific conversation.

The system provides initial RoEs: Text only—text with no limit in the length are the only content type; restricted text—that is, only a finite number of character text messaging, such as only 160 characters or some other pre-defined number; all allowed, where all the content types, interaction types, types of reaction and actions with the content are allowed.

Figure 1:
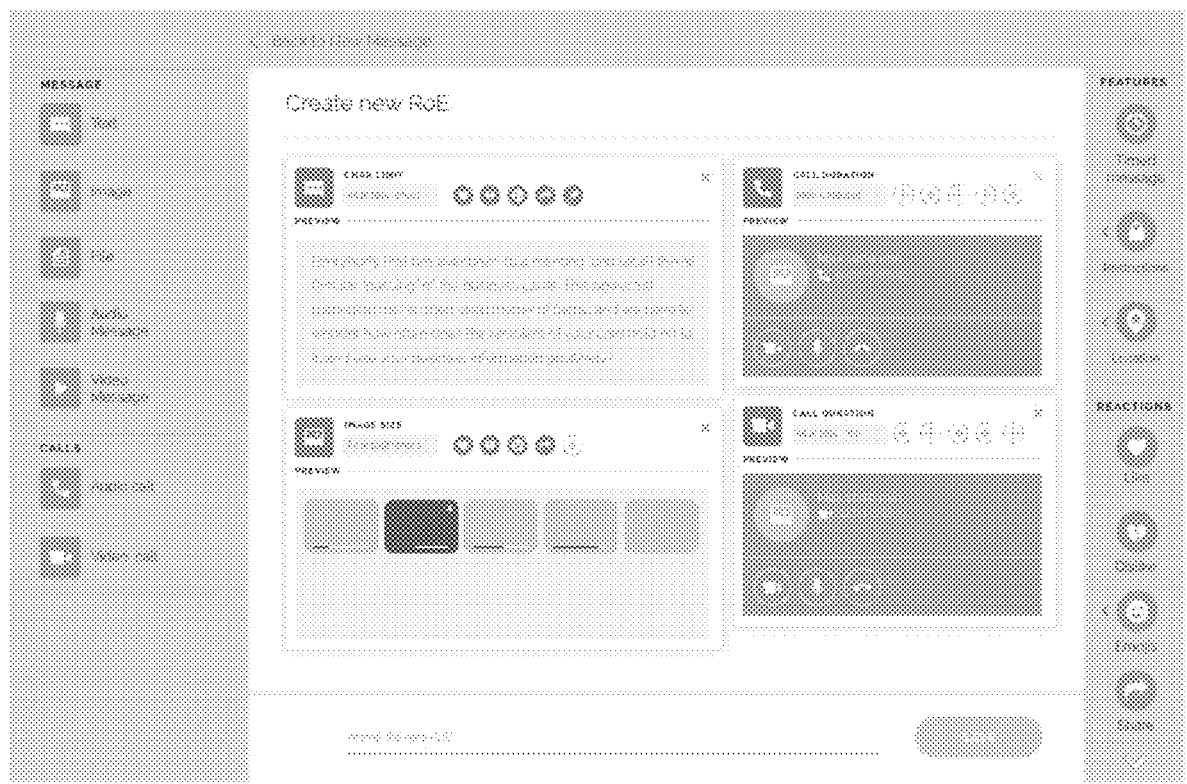
FIG. 1 is a screen capture of the present invention illustrating messages, calls, and reaction features.

Users can create new RoEs and save them in the system. As seen in FIG. 1, there is shown a screen of the present invention. The basic idea is that the user can enable/disable the content types ("Message"), types of interaction ("Calls"), reactions and actions that can be performed with the content ("Reaction"). At the present invention, it is enough to click the option on the side (left) of the RoE screen in order to enable/disable it and define its additional settings. Inside the screen a user can define additional options for the chosen content and interaction types. This is illustrated in FIG. 1.

Figure 2:
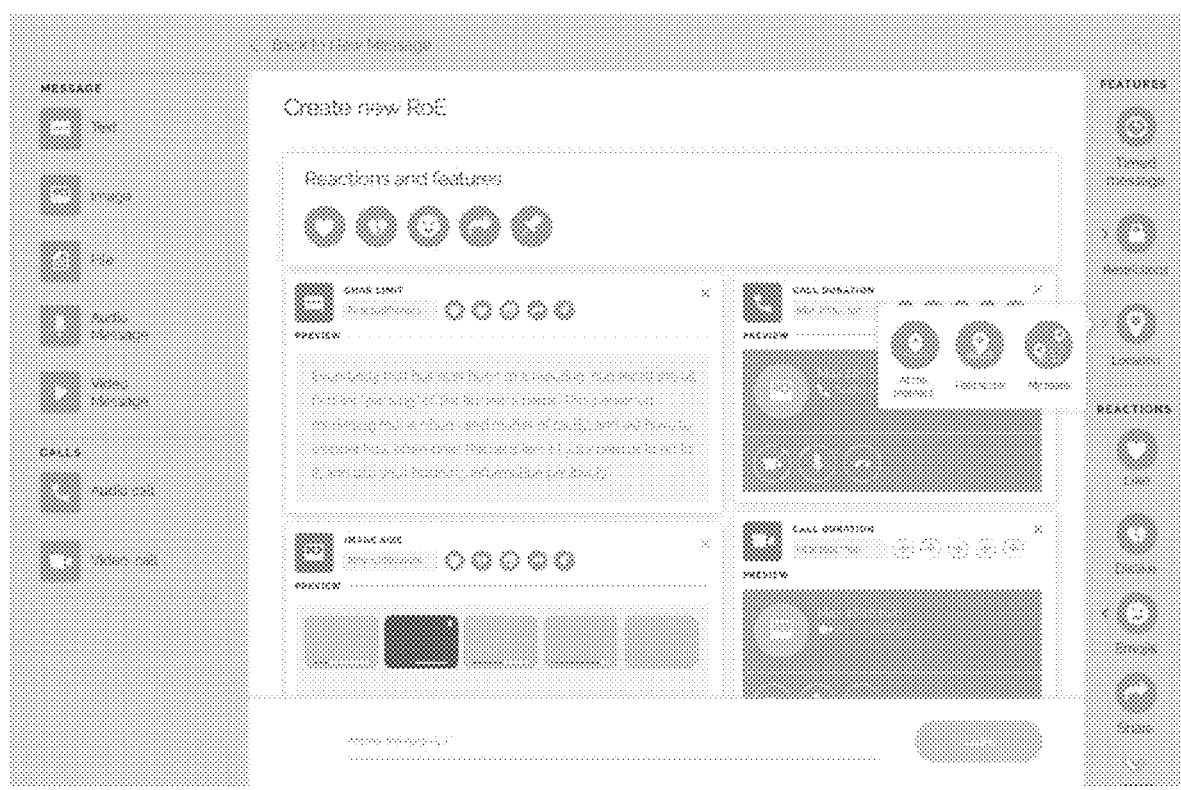
FIG. 2 is a screen capture of the present invention defining features of location and message life time.

As illustrated in FIG. 2, the conversation initiator may even independently define additional features such as ability to see the location in a specific manner and the message life-time.

Figure 3:
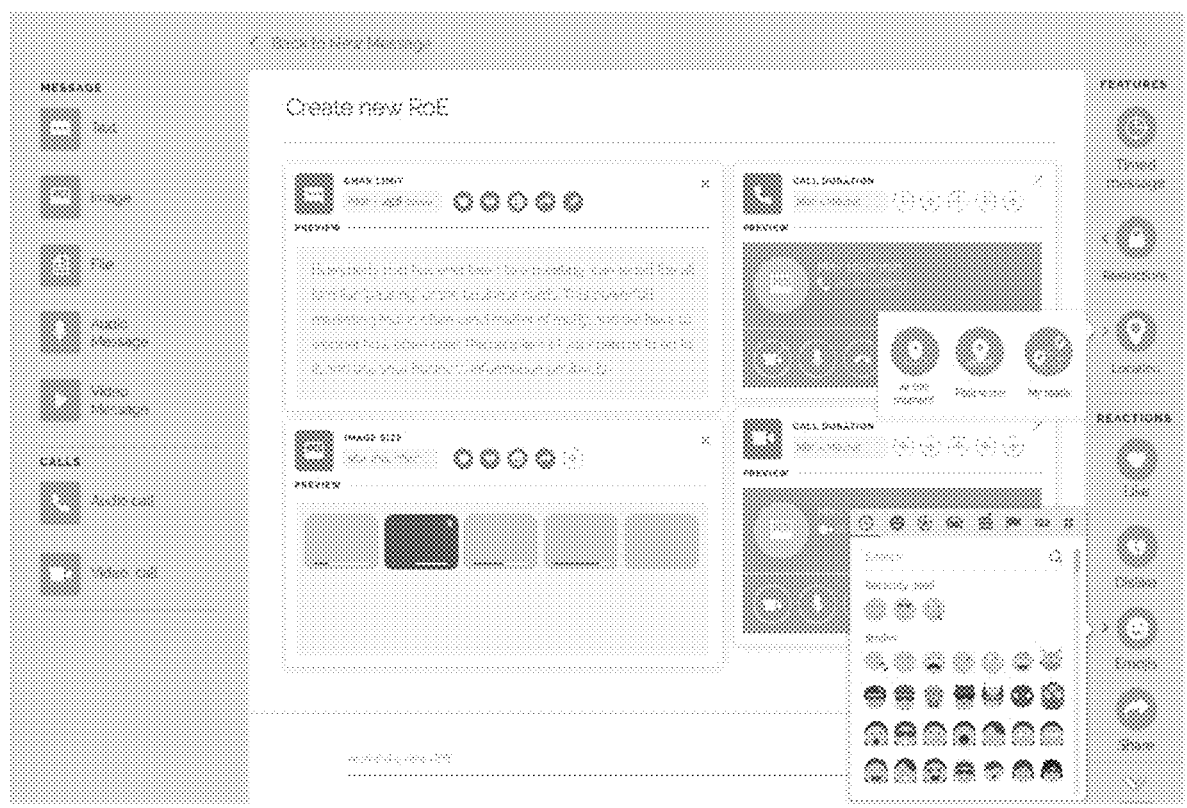
FIG. 3 is a screen capture of the present invention illustrating available reactions.

A user can select available reactions from the list, by hovering the mouse over the list and dragging the reactions to an active zone. See the "Emojis" setting at the image in FIG. 3.

Figure 4:
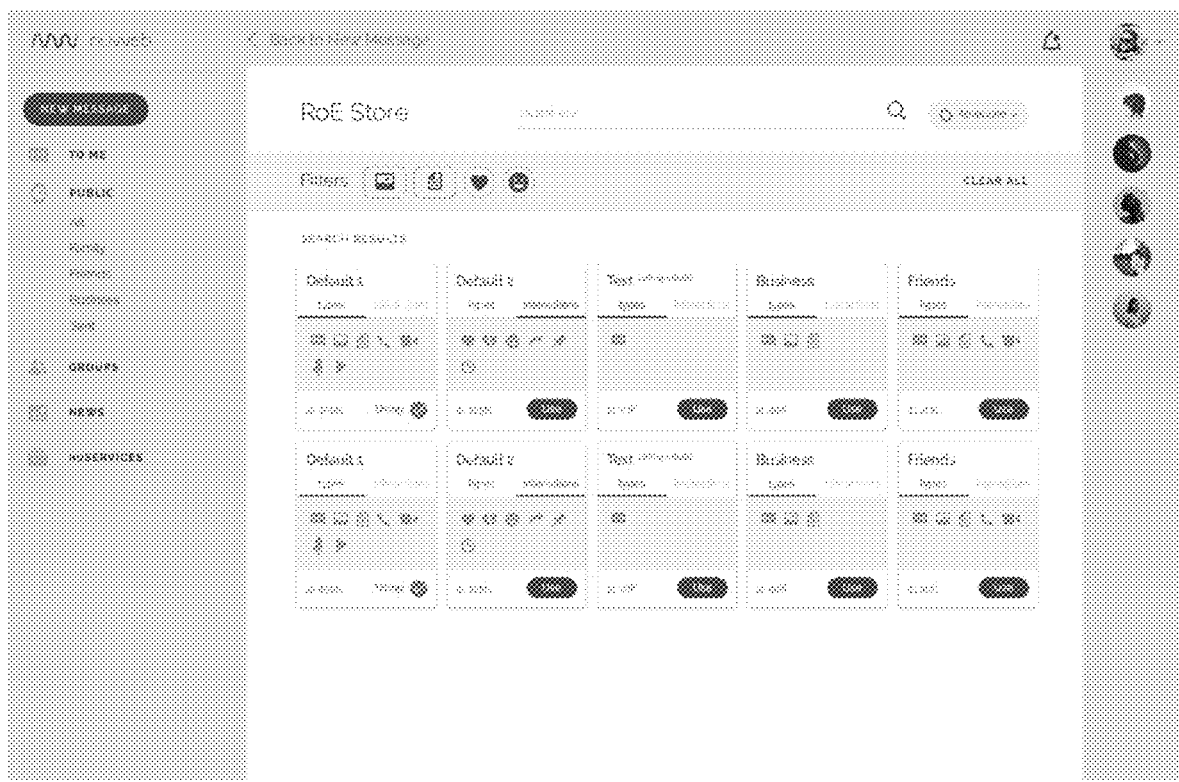
FIG. 4 is a screen capture of the customized rules of engagement.

Users can save customized RoEs and apply them to a conversation with or without additional changes. See the RoE store image illustrated in FIG. 4.

Figure 5:
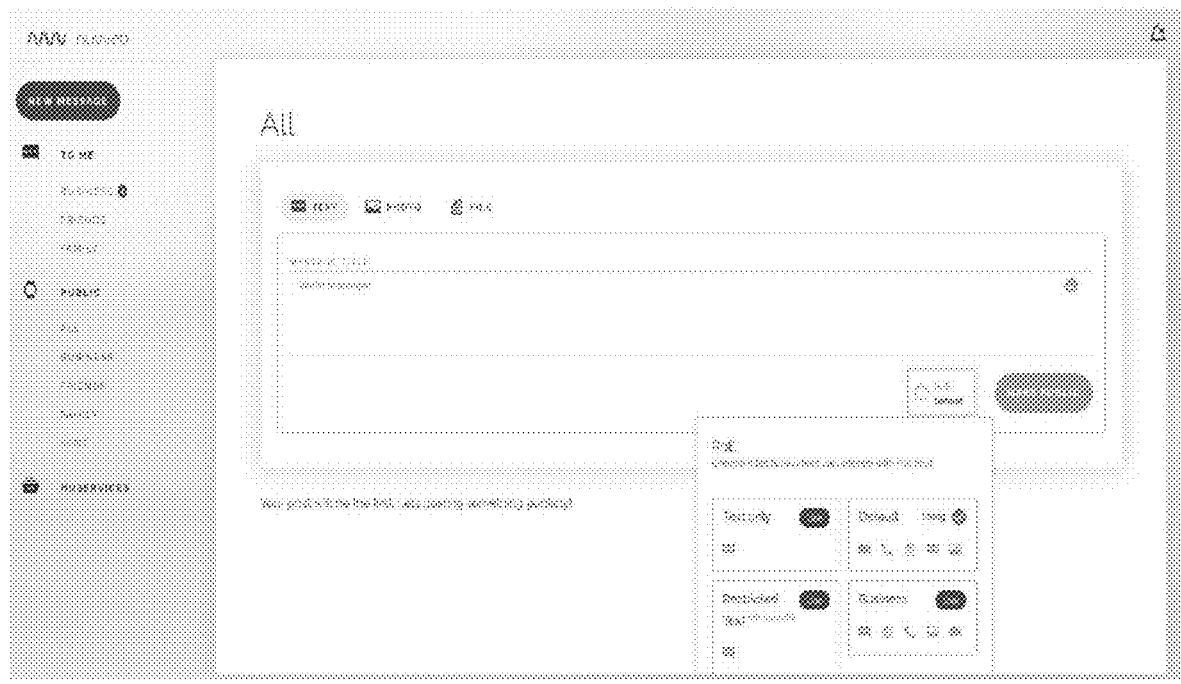
FIG. 5 is a screen capture of a user selecting the rules of engagement settings.

The main point is that the user can switch RoE for different conversations on the platform in a totally independent manner. Once a user has initiated a conversation he/she can control the type of content and interaction, the reactions and actions that will act specifically for this conversation. As a matter of fact, the user is able to create/apply a new communication protocol for each conversation. This option is available directly from the conversation. Accordingly, the user shall click the RoE settings at the conversation box and select the settings wanted. This is seen in the illustration for FIG. 5.

If any of the RoE settings seem inconvenient or unreasonable to other conversation participant, they can always request the conversation initiator to change them.

From the development perspective, all the interaction is based on, what is called, Content Objects and Conversations. Basically, for the present system any interaction between the system users is an attempt to send a Content Object to a Conversation. Each content object has a number of properties. The main content object properties are:

Content Object Type: a value from a set of values enabled for the system. The content object types represent: a text message; an image; a file; an audio message; a video message; a call (audio or video). The list of Content Object Types may be broadened as required and adding new Content Object Types will not affect the present invention.

Conversation ID: unique identification number of the conversation to which this Content Object is being set. Each Conversation has a number of properties. The main properties of a Conversation are:

Owner: Unique ID of the User, who has initiated the Conversation (sent the first Content Object within this Conversation).

Rules of Engagement (RoE): the set of rules applied to this specific conversation. The RoE included the following parameters:

Types of Content Object allowed for this Conversation. For example, a specific conversation may not allow online calls or videos, or may support only text messages.

Features that can be used within this Conversation. For example, location or timer may currently be enabled for the conversation. The list of features may be broadened with ability to share the screen or camera, as well as any other additional features, not affecting the present invention.

Restrictions applied to Content Objects of a specific Type within the Conversation. For example, number of symbols in a text message, size of a video or image, length of an audio, and other parameters may be limited. The list of restrictions for each Content Object Type may be broadened as required, not affecting the present invention.

Reactions and Actions. For each conversation there can be enabled some specific reactions (likes, emoji, dislikes, etc.) and actions (share, copy, etc.) Only those enabled reactions are available and displayed for all the Conversation Participants within the conversation.

Conversation ID: Unique ID of the Conversation.

Other parameters: other parameters may include the time of conversation initiation, IDs of other users taking part in the conversation (Conversation Participants), total number of messages within the conversation, content of the messages sent within the conversation and any other parameters of the conversation, as required. The list of other parameters may be customized and adjusted subject to the system needs and will not affect the patented concept.

Prerequisites

The present invention is used within a messaging platform that has some registered users. Parameters of each specific user and relations between them may be as known in the art. Within the system there already exists at least one Default RoE (currently, the system provided four initial RoE but their number, as well as their settings may be different and this will not affect the present invention). Other RoE sets can also be available in the system. Parameters of each RoE are saved in the database.

RoE Definition Flow

Once a user (Conversation Owner) has started a Conversation, this Conversation is assigned the Default RoE. Information about the Conversation is saved in the database. The user is defined as the Conversation Owner.

The Conversation Owner may change the Conversation RoE with any other RoE set available in the system (if any) or may create own RoE set for this Conversation. If a new RoE set is created, it is saved in the database as a new RoE. Subject to the system and user needs, this new RoE may be saved only within this specific Conversation or independently. If saved independently, the Conversation Owner and/or any user can then apply this RoE set from the database. The way, a new RoE is processed may affect the system performance, and may be changed with the view of that and of the user convenience. The way a new RoE set is processed doesn't affect the present invention.

Once a new RoE has been defined for the Conversation, the Conversation is updated and now this new RoE is assigned to it (the previous RoE is deleted from the Conversation settings). The Conversation Owner may change RoE multiple times.

Conversation Flow Related to RoE

Figure 6:
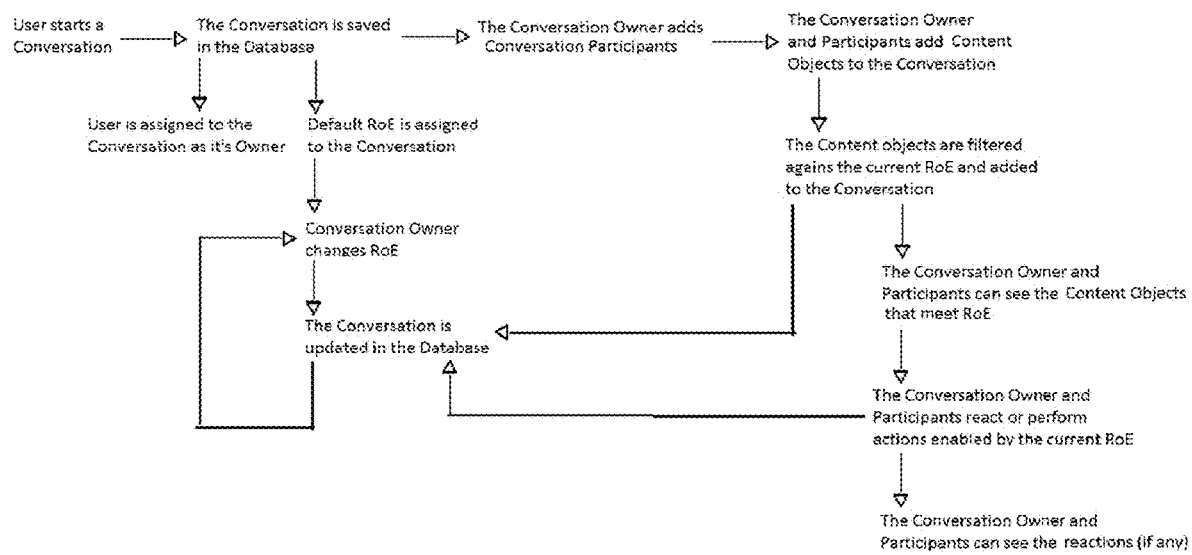
FIG. 6 is the conversation flow diagram related to the rules of engagement.

The general Conversation Flow is shown in the diagram and explained in details below and shown in FIG. 6. As soon as a conversation has been created, its parameters are saved in the database. After the Conversation has been created the Conversation Owner can, at any moment of the Conversation: change the RoE; invite Conversation Participants; delete the Conversation Participant; and send different Content Objects to the Conversation. After a Conversation Participant has entered a Conversation (accepted the invitation), the Conversation Participant at any moment of the conversation can: request a RoE change from the Owner; send different Content Objects to the Conversation.

Figure 7:
FIG. 7 is a diagram of a content object referenced against rules set by the conversation owner.

With reference to FIG. 7, once a Content Object has been sent to the Conversation, it is checked against the current RoE. The Content Object will not be added to the Conversation if: this type of Content Objects is not enabled for RoE applied to this Conversation or the specific Content Object does not meet the Restrictions defined for this Content Type within the RoE applied to this Conversation.

After a Content Object has been added to the Conversation, the Features enabled for the Conversation are applied to the Content Object (e.g. location is displayed). Also, after a Content Object has been added to the Conversation, the UI elements (buttons) that correspond to Actions and Reactions available for the Conversation are displayed by the Content Object. Both the Content Owner and the Conversation Participants can perform Actions and React to the Conversation.

Implementation

Currently the concept is implemented using a two-layer cloud database and json requests in order to upload the RoE, save and update the Conversation and check the Content Objects against the applicable RoE. However, specific implementation details may change as new technologies develop or new system needs arise.

The specific tools used for implementation will not affect the present invention of multiple customizable communication protocols used within one platform or application and defined and applied by users on the go. The users can create, save and apply predefined set of RoE and/or modify them on the go, and independently defining what content can be created and consumed by them, how others can use this content, how they can react to this content and what means of interaction shall be available for each person-to-person, person to application or person-to-group conversation initiated by this user in our platform.

Define What Content can be Created and Consumed:

For each conversation, it is up to the conversation initiator to decide what content may be created and will be consumed within this conversation. If a user wants to share pictures with limited text or with no text, a user can do it using a predefined RoE for a dedicated conversation. If the user decides to add a group video call to the conversation, the user can do that. At the same time, the user can have another conversation on the same platform that allows long texts and no pictures. It is up to the user to define the communication protocol applied to a specific conversation at a certain period of time, and thus they can be held at a single platform, stay target oriented and require no duplication. If a limitation seems inconvenient or unreasonable to other conversation participant, they can always request the conversation initiator to change it and this can be done fast and easy.

Define how Others can Use the Content and React to it:

The RoE concept enable users to define the rules of reaction and further usage for each conversation, which means that with no duplication or risks a user can open the same content to different users in different conversations within one platform and enable the reaction and usage options that seem most reasonable to a user. Moreover, the user can change them, should there appear such a need as the conversation keeps going. With the present invention, it is the user, not the application-creator, who decides what is applicable, secure and necessary for the published and consumed content.

Define What Means of Interaction are Available:

The RoE concept enable users to define the types of interaction for each conversation, which means that users can enable or disable ability to message, call or video-call to users, not subject to a chosen application, neither with blocking the ability for some users—it can be defined for each specific conversation. Moreover, the settings can be changed, should there appear such a need as the conversation keeps going, providing both comfort and ability to reach those a user needs in a way that is needed and when it is needed.

Define the Conversation Type:

The user can add or remove participants from the conversation, which means that from the perspective of design or of the rules of engagement applied to this specific conversation, nothing changes. This consistency will help to improve the user experience and to make sure that different kinds of conversations can be implemented within the same messaging application.

While main point of a customizable communication protocols is more about conversations that are taking place between the users and the ways to handle content, it is important to make sure that the users can also control additional features that effect the interaction participants. Currently, such an important feature is related to the location, as the user can enable others to see the history of the routes, current location and even switch to the "follow me" mode. Moreover, in the future there may be implemented new features, such as ability to share the phone-camera, the screen or provide a control over the messaging device, etc. This way the users will also be able to gain control over more device-oriented interaction and alter them along the way, should there arise such a need.

Figure 8:
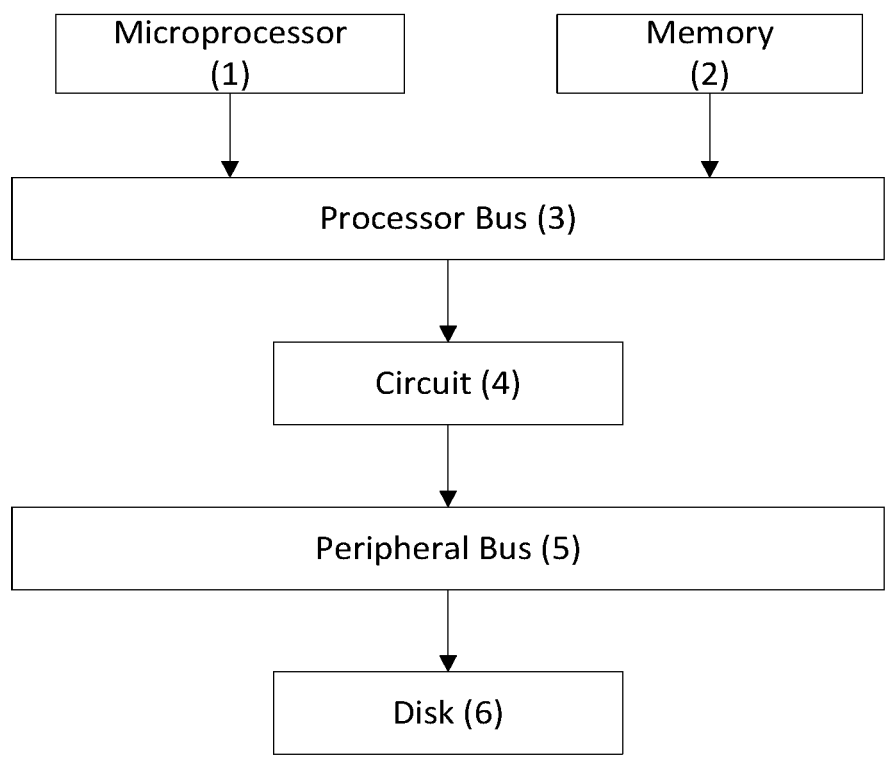
FIG. 8 is a schematic illustration of the connections of a computing system.
Figure 9:
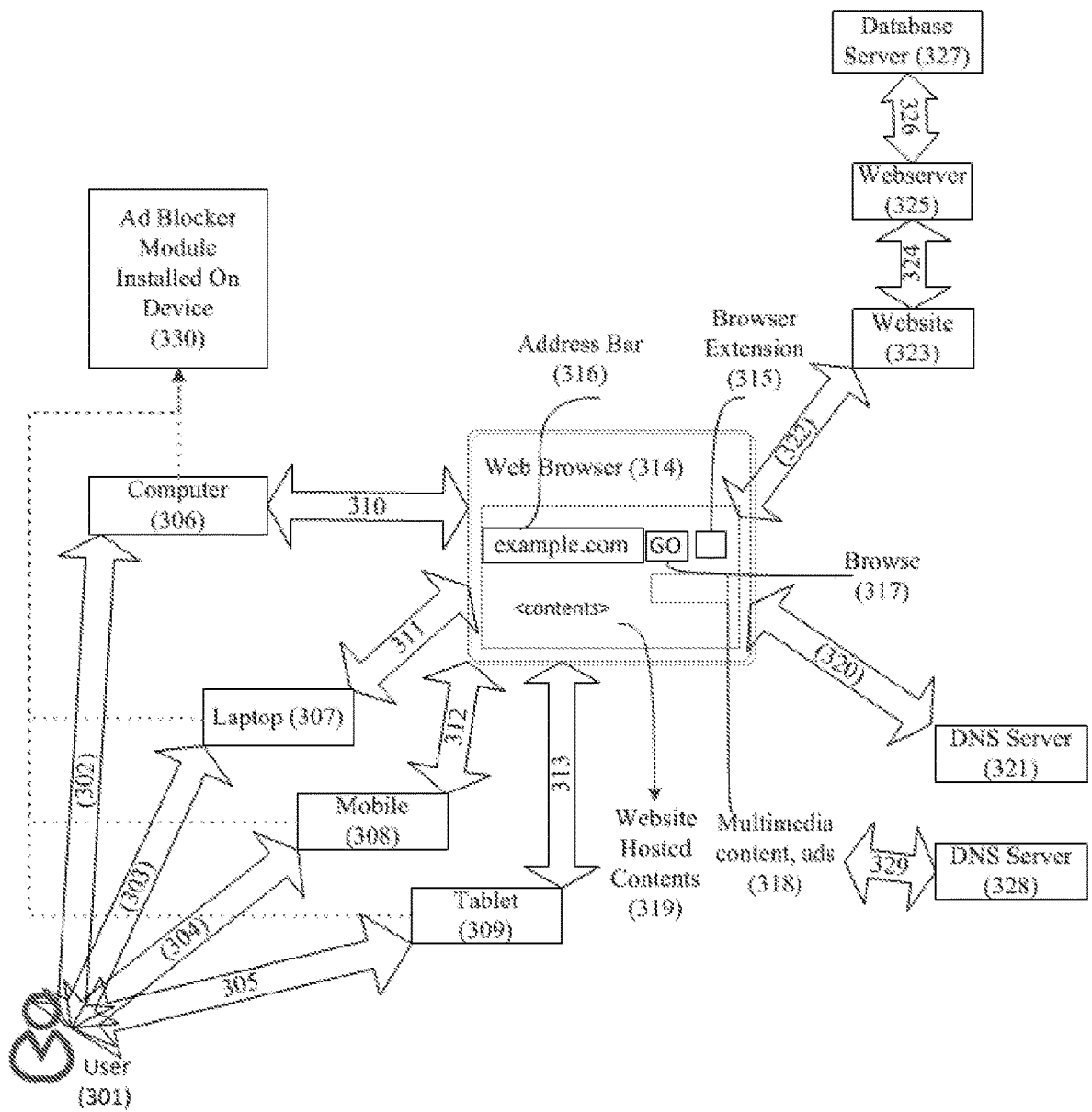
FIG. 9 is a schematic illustration showing how a user browses Internet and how different components act together to complete that browsing experience.
Figure 10:
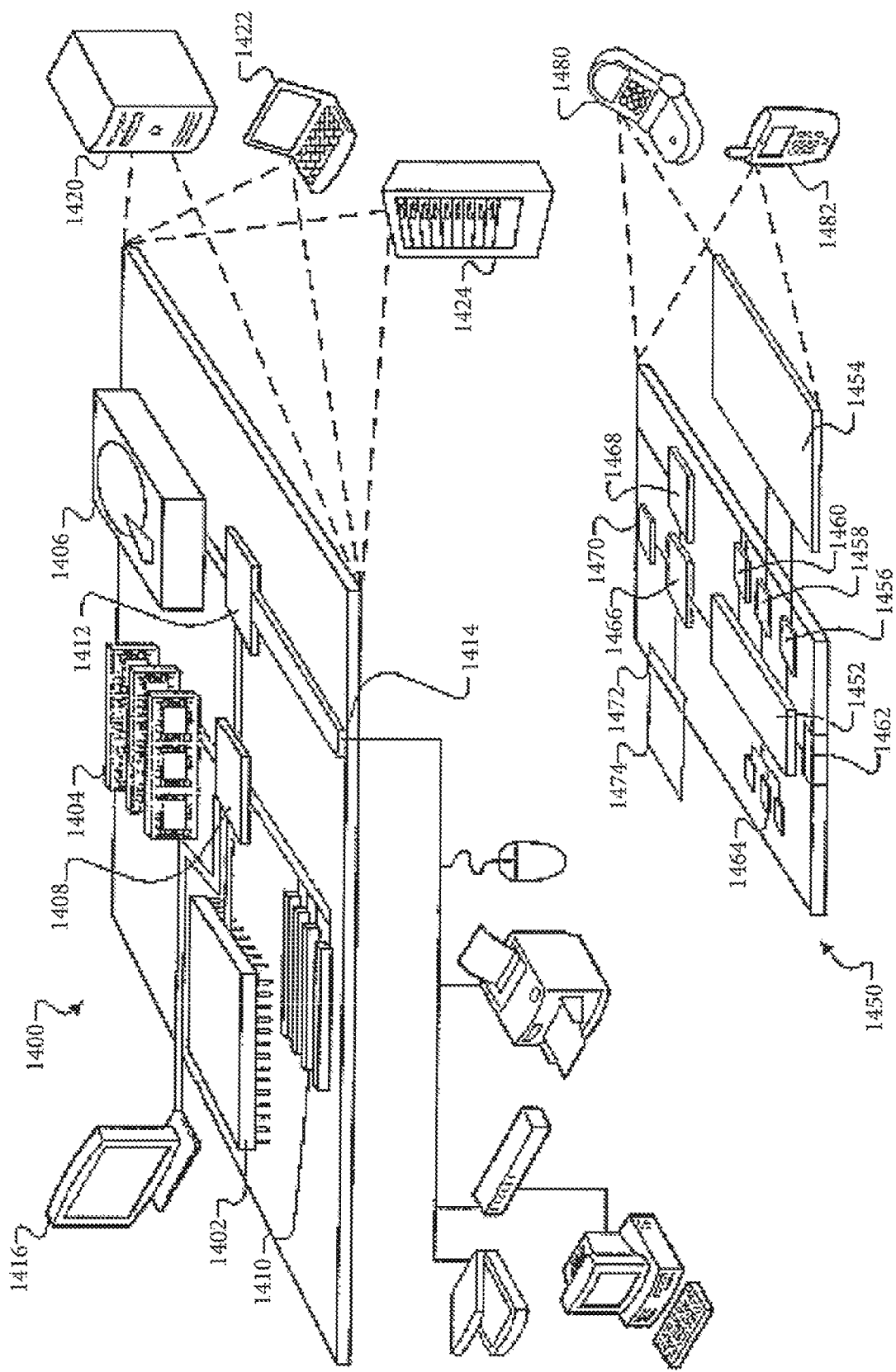
FIG. 10 is an illustration of a computer and mobile devices and their components.

Referring to FIGS. 8 through 10, there are shown various computer, network, internet and device components for use with the present invention. FIG. 8 illustrates a system of a computer or device which includes a microprocessor 1 and a memory 2 which are coupled to a processor bus 3 which is coupled to a peripheral bus 5 by circuitry 4. The bus 5 is communicatively coupled to a disk 6. It should be understood that any number of additional peripheral devices are communicatively coupled to the peripheral bus 5 in embodiments of the invention. Further, the processor bus 3, the circuitry 4 and the peripheral bus 5 compose a bus system for computing system 10 in various embodiments of the invention. The microprocessor 1 starts disk access commands to access the disk 6. Commands are passed through the processor bus 3 via the circuitry 4 to the peripheral bus 5 which initiates the disk access commands to the disk 6. In various embodiments of the invention, the present system intercepts the disk access commands which are to be passed to the hard disk.

FIG. 9 is a description of how communication works when the web is browsed and shows that a user (301) can use computer (306), laptop (307), mobile (308) or a tablet (309)

to launch a web browser (314) installed on that specific device to browse a specific website (323). The user can enter an address of some chosen web site on the address bar (316) and press a browser specific option to indicate to the browser to browse, as shown in FIG. 9 via button "Go" (317). After a user presses a browser specific option to navigate to a given web page as shown in FIG. 9 via button Go (317), web browser (314) first connects to domain name server (321) as configured in that device to resolve the web site domain to the IP address. Any user initiated request in browser page goes through to web site (323) as show via flow arrow 322 and then to web server (325) where web site (323) is hosted. Web server (325) in turn may connect to one or more database server(s) (327) to return specific user requested contents back to web browser (314). Multimedia content and advertisements (318) are received from server 328 as shown by flow arrow 329. In picture Browser Extension (315) is shown to be installed in web browser that has capability to block any outgoing web request; and at the same time can block any html element present on web page using some pre-defined blacklist of outgoing URLs. At the same time a device may also be using one or other Ad blocker (330) installed on device that can block any outgoing call irrespective of application calling and thus such an application can block ad requests originating from any application including web browsers. Considering such ad blockers (330) are installed on device, they have complete access to all code passed onto web page and can inject any specific piece of html code that can block any HTML elements present on web page. Thus depending on device setup, a web request may be blocked at browser level via ad blocker installed as browser extension (315) or may be blocked at network level using software module installed on device at network level and acting as ad blocker (330).

FIG. 10 shows an example of a computer device 1400 and a mobile computer device 1450, which may be used to implement the processes described herein, including the mobile-side and server-side processes for installing a computer program from a mobile device to a computer. Computing device 1400 is intended to represent various forms of digital computers, such as laptops, desktops, workstations, personal digital assistants, servers, blade servers, mainframes, and other appropriate computers. Computing device 1450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 1400 includes a processor 1402, memory 1404, a storage device 1406, a high-speed interface 1408 connecting to memory 1404 and high-speed expansion ports 1410, and a low speed interface 1412 connecting to low speed bus 1414 and storage device 1406. Each of the components 1402, 1404, 1406, 1408, 1410, and 1412 are interconnected using various busses, and may be mounted on a common motherboard or in other manners as appropriate. The processor 1402 can process instructions for execution within the computing device 1400, including instructions stored in the memory 1404 or on the storage device 1406 to display graphical information for a GUI on an external input/output device, such as display 1416 coupled to high speed interface 1408. In other implementations, multiple processors and/or multiple busses may be used, as appropriate, along with multiple memories and types of memory. Also, multiple computing devices 1400 may be connected, with each device providing portions of the necessary operations (e.g., as a server bank, a group of blade servers, or a multi-processor system).

The memory 1404 stores information within the computing device 1400. In one implementation, the memory 1404 is a volatile memory unit or units. In another implementation, the memory 1404 is a non-volatile memory unit or units. The memory 1404 may also be another form of computer-readable medium, such as a magnetic or optical disk.

The storage device 1406 is capable of providing mass storage for the computing device 1400. In one implementation, the storage device 1406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 1404, the storage device 1406, or memory on processor 1402.

The high speed controller 1408 manages bandwidth-intensive operations for the computing device 1400, while the low speed controller 1412 manages lower bandwidth-intensive operations. Such allocation of functions is exemplary only. In one implementation, the high-speed controller 1408 is coupled to memory 1404, display 1416 (e.g., through a graphics processor or accelerator), and to high-speed expansion ports 1410, which may accept various expansion cards (not shown). In the implementation, low-speed controller 1412 is coupled to storage device 1406 and low-speed expansion port 1414. The low-speed expansion port 1414, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 1400 may be implemented in a number of different forms, as shown in the figure. For example, it may be implemented as a standard server 1420, or multiple times in a group of such servers. It may also be implemented as part of a rack server system 1424. In addition, it may be implemented in a personal computer such as a laptop computer 1422. Alternatively, components from computing device 1400 may be combined with other components in a mobile device (not shown), such as device 1450. Each of such devices may contain one or more of computing device 1400, 1450, and an entire system may be made up of multiple computing devices 1400, 1450 communicating with each other.

Computing device 1450 includes a processor 1452, memory 1464, an input/output device such as a display 1454, a communication interface 1466, and a transceiver 1468, among other components. The device 1450 may also be provided with a storage device, such as a microdrive or other device, to provide additional storage. Each of the components 1450, 1452, 1464, 1454, 1466, and 1468 are interconnected using various busses, and several of the components may be mounted on a common motherboard or in other manners as appropriate.

The processor 1452 can execute instructions within the computing device 1450, including instructions stored in the memory 1464. The processor may be implemented as a chipset of chips that include separate and multiple analog and digital processors. The processor may provide, for example, for coordination of the other components of the device 1450, such as control of user interfaces, applications run by device 1450, and wireless communication by device 1450.

Processor 1452 may communicate with a user through control interface 1458 and display interface 1456 coupled to a display 1454. The display 1454 may be, for example, a TFT LCD (Thin-Film-Transistor Liquid Crystal Display) or an OLED (Organic Light Emitting Diode) display, or other appropriate display technology. The display interface 1456 may comprise appropriate circuitry for driving the display 1454 to present graphical and other information to a user. The control interface 1458 may receive commands from a user and convert them for submission to the processor 1452. In addition, an external interface 1462 may be provided in communication with processor 1452, so as to enable near area communication of device 1450 with other devices. External interface 1462 may provide, for example, for wired communication in some implementations, or for wireless communication in other implementations, and multiple interfaces may also be used.

The memory 1464 stores information within the computing device 1450. The memory 1464 can be implemented as one or more of a computer-readable medium or media, a volatile memory unit or units, or a non-volatile memory unit or units. Expansion memory 1474 may also be provided and connected to device 1450 through expansion interface 1472, which may include, for example, a SIMM (Single In Line Memory Module) card interface. Such expansion memory 1474 may provide extra storage space for device 1450, or may also store applications or other information for device 1450. Specifically, expansion memory 1474 may include instructions to carry out or supplement the processes described above, and may include secure information also. Thus, for example, expansion memory 1474 may be provided as a security module for device 1450, and may be programmed with instructions that permit secure use of device 1450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1464, expansion memory 1474, memory on processor 1452, or a propagated signal that may be received, for example, over transceiver 1468 or external interface 1462.

Device 1450 may communicate wirelessly through communication interface 1466, which may include digital signal processing circuitry where necessary. Communication interface 1466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1468. In addition, short-range communication may occur, such as using a Bluetooth, Wi-Fi, or other such transceiver (not shown). In addition, GPS (Global Positioning System) receiver module 1470 may provide additional navigation- and location-related wireless data to device 1450, which may be used as appropriate by applications running on device 1450.

Device 1450 may also communicate audibly using audio codec 1460, which may receive spoken information from a user and convert it to usable digital information. Audio codec 1460 may likewise generate audible sound for a user, such as through a speaker, e.g., in a handset of device 1450. Such sound may include sound from voice telephone calls, may include recorded sound (e.g., voice messages, music files, etc.) and may also include sound generated by applications operating on device 1450.

The computing device 1450 may be implemented in a number of different forms, as shown in the figure. For example, it may be implemented as a cellular telephone 1480. It may also be implemented as part of a smartphone 1482, personal digital assistant, tablet, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" or "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "computer readable storage medium" may be any tangible medium (but not a signal medium—which is defined below) that can contain, or store a program. The terms "machine readable medium," "computer-readable medium," or "computer readable storage medium" are all non-transitory in their nature and definition. Non-transitory computer readable media comprise all computer-readable media except for a transitory, propagating signal.

The term "machine-readable signal" refers to any signal used to provide machine instructions and/or data to a programmable processor. A "computer readable signal medium" may be any computer readable medium that is not a computer readable storage medium and that can communicate, propagate, or transport a program.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Elements of different implementations described herein may be combined to form other implementations not specifically set forth above. Elements may be left out of the processes, computer programs, Web pages, etc. described herein without adversely affecting their operation. Furthermore, various separate elements may be combined into one or more individual elements to perform the functions described herein.

The invention is not restricted to the details of the foregoing embodiments. The invention extends to any novel one, or any novel combination, of the features disclosed in this specification (including any accompanying claims, abstract and drawings), or to any novel one, or any novel combination, of the steps of any method or process so disclosed.

What is claimed is:

1. A customizable communication platform system comprising:
    a customizable set of rules of engagement;
    a conversation initiated from a first communication device and assigned a conversation owner;
    said conversation saved in a data base;
    said conversation including a conversation owner communication device and at least one other conversation participant communication device;
    said conversation owner communication device and said at least one other conversation participant communication device permit respective users of each said conversation owner communication device and said at least one other conversation participant communication device to add content objects to said conversation;
    said content objects are filtered against said customizable set of rules of engagement and said filtered content objects are added to said conversation;
    said conversation owner communication device and said at least one other conversation participant communication device interpret and present said filtered content objects for review by said respective users of each said conversation owner communication device and said at least one other conversation participant communication device;
    said conversation owner communication device and said at least one other conversation participant communication device allow said respective users of each said conversation owner communication device and said at least one other conversation participant communication device to perform actions on said filtered content objects which are enabled by said customizable set rules of engagement as defined by said conversation owner;
    said conversation owner communication device and said at least one other conversation participant communication device interpret and present said actions for review by said respective users of each said conversation owner communication device and said at least one other conversation participant communication device.

2. The customizable communication platform system according to claim 1 wherein said conversation owner can define a means of interaction available for said conversation, including at least one of: video-calls; phone-calls; text-share; image-share; and any combination thereof.

3. The customizable communication platform system according to claim 1 wherein said conversation owner can define a type of said conversation, including at least one of: a one to one conversation; a group conversation; conversations or communications of a user with a website, application, or service wherein said user publishes and/or receives content, and any combination thereof.

4. The customizable communication platform system according to claim 1 wherein said at least one other conversation participant communication device provides said conversation participant communication device user with a set of options, said options comprising: registering for said customizable communication platform system; registered users entering said conversation by acceptance of an invitation; said registered users requesting a change of the customizable set of rules of engagement from said conversation owner at any time; and an ability for said registered users to send various said content objects to said conversation at any time.

5. The customizable communication platform system according to claim 1 wherein said conversation owner modifies said customizable set of rules of engagement for registered users comprising:
    at least one default rule of engagement which is implemented when a conversation is created;
    other initial rules of engagement selectable by said conversation owner to apply to said conversation;
    a customization tool to enable or disable types of content, types of interactions, and types of actions or reactions available to a participant of said conversation of one specific conversation, of conversations owned by said respective users in the system, or a combination thereof;
    said customization tool to otherwise customize said customizable set of rules of engagement;
    an optional graphical user interface (GUI) to display said customization tool; and a save feature capable of saving said customized said customizable set of rules of engagement specifically to said conversation, or independently for use in other conversations.

6. The customizable communication platform system according to claim 5 wherein said customizable set of rules of engagement defines at least the following regarding user content:
   creation of said user content within said conversation by said conversation participants; and
   consumption of said user content within said conversation by said conversation participants.

7. The customizable communication platform system according to claim 5 wherein said customizable set of rules of engagement defines at least the following regarding use and sharing of user content:
   using and sharing of said user content by said conversation participants within said conversation;
   using and sharing of said user content by said conversation participants outside of said conversation;
   using and sharing of said user content by non-participants outside of said conversation;
   using and sharing of said user content by non-registered non-participants outside of said conversation.

8. The customizable communication platform system according to claim 5 wherein said customizable set of rules of engagement defines at least the following regarding reacting to user content:
   reactions presented in the optional graphic user interface or otherwise available to said conversation participants within said conversation;
   reactions presented in the optional graphic user interface or otherwise available to said conversation participants outside of said conversation;
   reactions presented in the optional graphic user interface or otherwise available to non-participants outside of said conversation;
   reactions presented in the optional graphic user interface or otherwise available to non-registered non-participants outside of said conversation.

9. The customizable communication platform system according to claim 5 wherein said conversation owner further defines sets of rules of engagement that control additional features that affect participant interaction including at least:
   participant current and historical location; participant phone camera; participant phone screen; control over participant messaging device; and other device-oriented participant interactions.

10. The customizable communication platform system according to claim 1 wherein said customizable communication platform system is a two-layer cloud-based communication platform system capable of incorporating different communication protocols as controlled by customizable registered user input comprising:
    said content objects of text messages, images, files, audio messages, video messages, and audio or video calls;
    a conversation structure with a unique conversation identifier to which said content objects belong;
    an owner device from which a user initiates said conversation, alters the customizable set of rules of engagement, adds or removes participants, or share said content objects to said conversation as a participant;
    wherein said rules of engagement filter content objects by enabled or restricted content object types, conversation features, reactions or actions available to said participants in response to said shared content objects, and linked said unique conversation identifier;
    at least one other device from which the user shares the content objects to said conversation as the participant or request changes to the customizable set of rules of engagement.

11. A method of using a communication platform defined by a customizable set of rules of engagement comprising:
    initiating a conversation from a first communication device and assigning a conversation owner;
    saving said conversation in a data base;
    including a conversation owner communication device and at least one other conversation participant communication device in said conversation;
    permitting respective users of said conversation owner communication device and said at least one other conversation participant communication device to add content objects to said conversation;
    filtering said content objects against said customizable set of rules of engagement;
    adding said filtered content objects to said conversation;
    interpreting and presenting said filtered content objects for review by said respective users on said conversation owner communication device and said at least one other conversation participant communication device;
    allowing said respective users of said conversation owner communication device and said at least one other conversation participant communication device to perform actions on said filtered content objects which are enabled by said customizable set rules of engagement as defined by said conversation owner;
    interpreting and presenting said actions for review by said respective users on said conversation owner communication device and said at least one other conversation participant communication device.

12. The method according to claim 11 wherein said conversation owner defines a means of interaction available for said conversation, including selecting at least one of video-calling; phone-calling; text-sharing; image-sharing; or conversing in any combination of the above.

13. The method according to claim 11 wherein said conversation owner defines a type of said conversation, including at least:
    conversing one to one;
    conversing as a group;
    publishing content on a website, application, or other service;
    receiving content on a website, application, or other service;
    conversing in any combination of the above.

14. The method according to claim 11 wherein said at least one other conversation participant communication device performs actions comprising:
    registering for said communication platform;
    accepting at least one invitation to converse;
    requesting a change of the customizable set of rules of engagement from said conversation owner at any time;
    sharing various said content objects to said conversation at any time.

15. The method according to claim 11 wherein said conversation owner modifies said customizable set of rules of engagement for registered users at any time comprising:
    automatically implementing at least one default rule of engagement by creating said conversation;
    implementing other pre-selectable rules of engagement;
    customizing said other pre-selectable rules of engagement by enabling, disabling, or restricting types of content, types of interactions, or types of action or reaction available to conversation participants to create at least one set of customized pre-selectable rules of engagement;

customizing said at least one set of customized pre-selectable rules of engagement in a graphical user interface (GUI);

saving said at least one set of customized pre-selectable rules of engagement to a specific conversation or independently;

applying said at least one set of customized pre-selectable rules of engagement to other conversations or system-wide.

16. The method according to claim 15 wherein said customizable set of rules of engagement govern at least:

creating user content within said conversation by said conversation participants;

consuming of said user content within said conversation by said conversation participants;

using and sharing of said user content by said conversation participants within said conversation;

using and sharing of said user content by said conversation participants outside of said conversation;

using and sharing of said user content by non-participants outside of said conversation;

using and sharing of said user content by non-registered non-participants outside of said conversation;

enabling or restricting reactions presented in the graphical user interface or otherwise available to said conversation participants within said conversation;

enabling or restricting said reactions presented in the graphical user interface or otherwise available to said conversation participants outside of said conversation;

enabling or restricting said reactions presented in the graphical user interface or otherwise available to non-participants outside of said conversation;

enabling or restricting said reactions presented in the graphical user interface or otherwise available to non-registered non-participants outside of said conversation.

17. The method according to claim 15 wherein said conversation owner further defines sets of rules of engagement that control additional features that affect participant interaction including at least:

enabling or requiring participant current and historical location;

sharing participant phone camera;

sharing participant phone screen;

controlling participant messaging device; and enabling other device-oriented participant interactions.

18. The method according to claim 11 wherein said communication platform is a two-layer cloud-based communication platform capable of incorporating different communication protocols as controlled by customizable registered user input comprising:

creating and sharing content objects comprising text messages, images, files, audio messages, video messages, and audio or video calls;

assigning said content objects to a conversation structure with a unique conversation identifier;

using an owner device to initiate a conversation, alter the customizable set of rules of engagement, add or remove participants, or share said content objects to said conversation as a participant;

modifying and filtering said content objects by said customizable set of rules of engagement by enabling or restricting said content object types, enabling or restricting conversation features, enabling or restricting all or specific reactions or actions available to said participants in response to said shared content objects, and linking to said unique conversation identifier;

using at least one other device to share said content objects to said conversation as a participant or request changes to the customizable set of rules of engagement.

* * * * *